BINARY MAGNETIC MEMORY DEVICE

Filed June 29, 1961

INVENTOR

DAVID H. SCHAEFER

BY G. W. O'Brien Richard J. Keegan

ATTORNEYS

United States Patent Office 3,198,955
Patented Aug. 3, 1965

3,198,955
BINARY MAGNETIC MEMORY DEVICE

David H. Schaefer, Oxon Hill, Md., assignor to the United States of America as represented by the Administrator of the National Aeronautics and Space Administration Filed June 29, 1961, Ser. No. 120,803
21 Claims. (Cl. 307—88)
(Granted under Title 35, U.S. Code (1952), sec. 266)

The invention described herein may be manufactured and used by or for the Government of the United States of America for governmental purposes without the payment of any royalties thereon or therefor.

The present invention relates to magnetic storage systems and more particularly is directed to circuits employing magnetic storage elements.

Digital information, such as that used in computers, is usually presented in a coded binary form in which each character of the digital information is represented by a group of "ones" and "zeros." This binary notation is provided electrically by voltages which have different levels or amplitudes. For example, a positive voltage may represent a binary "zero" and a zero potential may represent a binary "one." Electrical components which have two stable states, such as an "on" state and an "off" state or a positive state and a negative state, my also be used to designate "ones" and "zeros" of the binary code.

Magnetic elements constructed in the shape of a core, ribbon or bar from magnetic substances that possess a low coercive force and a high ratio of residual to saturation flux density are also employed as binary elements in digital systems. These magnetic elements may readily be magnetized by a current carrying winding to establish either of two stable magnetic remanent states in the magnetic material. The two stable remanent states of the magnetic material may arbitrarily be chosen to represent either a binary "one" or a binary "zero." The advantage of using elements of this type in circuits employing binary techniques is that the binary information may be stored or maintained in the element without supplying any additional power thereto and these elements retain these magnetic characteristics despite long continuous use.

During the normal operation of such a magnetic binary element it is desirable to be able to determine the state of the magnetic element, that is, whether the element is storing a binary "one" or a binary "zero." This involves a determination of which one of the two stable magnetic remanent states has been established in the magnetic material. Prior devices accomplished this interrogation or readout process by providing a special sensing winding about the magnetic element which would provide an indication of the remanent state of the magnetic element when activated by a current pulse. However, these prior sensing circuits destroyed the information retained in the magnetic element while interrogating the element. Subsequent devices have been developed which readout the information stored in the magnetic device without destroying this information. Such nondestructive readout devices either require complex electrical circuitry or it is necessary to use a complex magnetic configuration for the magnetic binary element.

The general purpose of this invention is to provide an improved nondestructive readout and state changing circuit for a magnetic binary element which embraces all the advantages of similarly employed readout circuits without any of the aforedescribed disadvantages. To obtain this, the invention contemplates using a winding coupled to a magnetic core element which is capable of changing the remanent state of the magnetic element when pulsed by a signal of predetermined magnitude and proper polarity. A readout signal having a first portion of one polarity and a second portion of opposite polarity is applied to the state changing winding. Means are provided which sense the remanent state of the core in relation to the first portion of the applied readout signal and, in the event the core is switched from one to the other of its stable remanent states by said first portion, the sensing means controls a switch or control circuit which allows the second portion of the readout signal to be applied to the state changing winding which returns the core to its original remanent state.

However, if the remanent state of the core is not changed by the first portion of the readout signal, the sensing means controls the switch circuit so that it will block or bypass the second portion of the readout signal and prevent this portion of the readout signal from switching the state of the magnetic device. Therefore either the original remanent state of the magnetic element is maintained by the readout signal or the element is driven from its initial stable remanent state to its second stable remanent state and is then returned to its initial stable remanent state by the readout signal.

An output winding coupled to the magnetic binary element indicates, by the induced voltage therein, whether or not the magnetic element has been switched by the readout signal. The form of the induced voltage is therefore indicative of the information originally stored by the magnetic binary element. This invention also contemplates the adaptation of the above described nondestructive readout circuit so that information can also be read into the magnetic binary element.

An object of this invention is to provide an improved interrogating system for determining the state of a binary element.

Another object of the present invention is to provide an improved readout circuit for determining the direction of the remanent flux in a magnetic storage element.

A further object of this invention is to provide an improved nondestructive readout circuit for determining the remanent magnetic state of a magnetic binary element without permanently destroying the information stored by the magnetic element.

Another object of the present invention is to provide an improved information readout and state changing circuit for a binary element which is capable of being stabilized in either of two stable remanent states.

A still further object of the invention is to provide an improved circuit for reading information into a binary magnetic element and for interrogating the magnetic element without permanently erasing the information retained in said magnetic element.

It is still a further object of this invention to provide an improved readout circuit which is simple to construct and relatively inexpensive and efficient to operate.

These and other objects and advantages of this invention will become more fully apparent from the following description of the annexed drawings in which.

Figure 1:
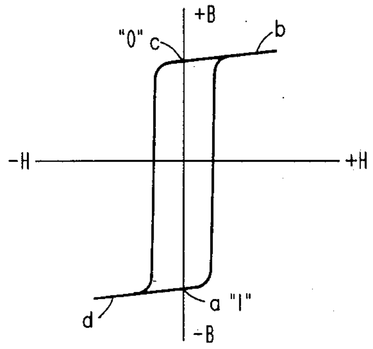
FIG. 1 is a diagram of the hysteresis loop of magnetic material of the type employed in magnetic binary circuits.

FIG. 1 graphically illustrates a substantially rectangular hysteresis loop that is exhibited by a magnetic material, e.g. ferrites of the type generally used in constructing a magnetic binary element. The magnetizing force H, in ampere turns per unit length, that is applied to a core of magnetic material by a current carrying winding is shown on the abscissa axis of the graph of this figure. The resulting magnetic flux density B, in webers per square unit of area, established within the magnetic core by this magnetizing force is shown on the ordinate axis of the graph in FIG. 1.

If the magnetic core has previously been magnetized and a positive magnetizing force, H, of sufficient strength is applied thereto, the flux density within the core will reach a saturation level in one direction, which will be arbitrarily called the positive direction and is shown at *b* in FIG. 1. Upon the removal of this magnetizing force from the core, the flux retained in the core establishes a remanent flux density in the core material which is shown at *c* on the graph. A negative magnetizing force of sufficient magnitude when applied to the magnetic core will drive the core into saturation in the opposite direction which will be called the negative direction and is shown at *d* on the graph. After the removal of this magnetizing force the remanent flux density established in the core material is shown at *a* in FIG. 1.

The two magnetic remanent conditions, *a* and *c* on the graph, constitute the two stable states of the magnetic material which are of interest herein. A magnetic element constructed with a material which exhibits these characteristics and shaped, for example, in the form of a simple toroid may be employed as a binary element in which the stable remanent states represent a binary "one" and a binary "zero". In FIG. 1 and throughout the other figures, the positive remanent state is arbitrarily selected to represent a binary "zero" and the negative remanent state a binary "one".

The magnetizing force, H, that drives the magnetic material about its hysteresis loop is generally produced by a winding which is coupled to or encircles a portion of the magnetic material. By standard notation a positive potential applied to the dotted end of a winding coupled to a core of magnetic material produces a positive magnetizing force which, if of sufficient magnitude, will provide a flux alignment within the magnetic core material in the positive direction. The application of a negative potential to the dotted end of the magnetic core winding produces a negative magnetizing force, and if this force is of sufficient magnitude, a flux alignment within the core in a negative direction will result.

Figure 2:
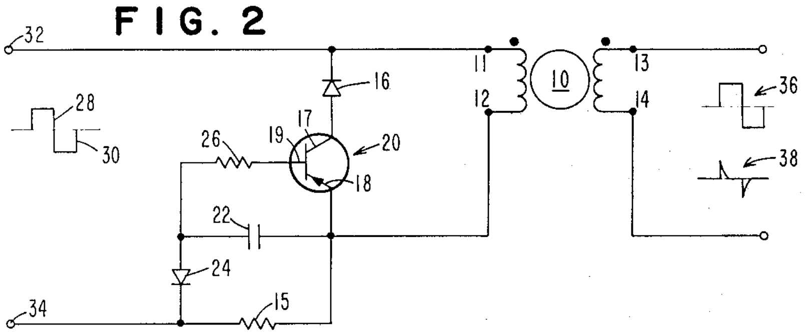
FIG. 2 is a schematic illustration of an embodiment of a nondestructive readout circuit employing the novel features of this invention.

In FIG. 2 a toroidal core shown at 10 is constructed from a magnetic material which exhibits a substantially rectangular hysteresis loop as shown in FIG. 1. Core 10 has an input winding 11–12 and an output winding 13–14 coupled thereto. The dotted ends of these windings are selected as shown in this figure. A sensing resistor 15 is connected to the not dotted end of the input winding 11–12. A control or switching circuit comprising a diode 16 and a PNP transistor switch 20 are connected in parallel with winding 11–12. Diode 16 has its cathode connected to the dotted end of the input winding 11–12 and its anode connected to the collector 17 of the transistor switch 20. The emitter 18 of the transistor switch is connected to the not dotted end of winding 11–12.

A series circuit comprising a storage capacitor 22 and a diode 24 is connected in parallel with the sensing resistor 15 with its capacitor end being connected to the not dotted end of the input winding 11–12. A resistor 26 is connected to the base electrode 19 of the transistor switch 20 and to the junction between the capacitor 22 and the diode 24. The diode 24 is connected to provide a low impedance charging path for the capacitor 22 and to prevent the discharge of this capacitor through the resistor 15. A readout signal comprising a square wave having a positive first half cycle 28 and a negative second half cycle 30 is applied to the input terminals 32, 34 of the nondestructive sensing circuit. The readout signal may comprise one complete cycle of the above described square wave or more than one complete cycle may be employed to produce repeated output indications of the static state of the magnetic binary element.

In describing the operation of this circuit, assume that the core is initially in the negative remanent state, that is, storing a binary "one," and it is desired to readout this information without destroying the remanent state of the core which represents the binary information. The readout signal is applied to the input terminals 32, 34 and the positive half cycle 28 of the readout signal produces a magnetizing force of plus H magnitude in the core 10 which causes the core to traverse its hysteresis loop, shown in FIG. 1, from the point *a*, negative remanence, to *b*, the region of flux density saturation in the positive direction. The changing flux in the core will induce a positive pulse at the dotted end of the output winding 13–14. During this change of flux alignment within the core a small magnetizing current will flow through the sensing resistor 15.

The small voltage developed across the resistor 15 charges the capacitor 22, but it is incapable of developing a sufficient voltage on the capacitor 22 to bias the transistor switch 20 into its conducting region. Therefore, when the negative half cycle 30 of the readout signal is applied to the dotted end of the winding 11–12 and to the cathode of diode 16, the shunt path provided by the diode 16 and the emitter-collector circuit of the transistor 20 will essentially be an open circuit. The core 10 will be driven from region *b*, positive saturation, to the region *d*, the negative saturation region. The change of flux within the core will induce a negative voltage at the dotted end of the output winding. Upon the removal of the negative portion of the readout signal from the winding 11–12, the remanent flux in the core will be in the negative direction, representing a binary "one."

If the core is in its other stable state, that is, in the positive remanent state representing a binary "zero," and the readout signal is applied to the input terminals of the circuit of FIG. 1 to determine the state of the core, the following sequence of events occurs. The positive half cycle 28 of the readout signal produces a positive magnetizing force that drives the core from the positive remanent state into the positive saturation region. As seen from the graph of FIG. 1, a very small change in flux occurs in the core in this situation. The major portion of the applied voltage 28 will appear across the sensing resistor 15. This voltage will charge the capacitor 22 and place the transistor 20 well into its conducting state.

The discharge path provided for the capacitor 22 is through the base-emitter junction of the transistor 20, the resistor 26 and the diode 24. The time constant of the capacitor discharge circuit is designed so that sufficient charge will be retained by capacitor 22 to bias the transistor switch 20 into its low impedance, conducting state during the entire negative portion 30 of the applied square wave. The low impedance shunt path presented by the diode 16 and the "on" transistor 20 provides a bypass path for the negative portion of the readout signal and prevents this negative signal from being applied to the input winding 11–12. Therefore, if the core is initially in the positive remanent state, a very small positive pulse is induced in the output winding 13–14 when the core 10 is driven from this state to the positive saturation region, and a small negative pulse is induced in this winding when the positive magnetizing force is removed and the core returns to the positive remanent state.

The application of the readout signal to the circuit of FIG. 2 will thus produce a different type of waveform in the output winding for each of the remanent states of the core. The waveforms 36 and 38 in FIG. 2 are approximate showings of the different voltages appearing across the winding 13–14 when the readout signal is applied to the circuit and the core 10 is storing a binary "one" and binary "zero," respectively. In each case, the information stored in the core 10 after readout is the same as that stored in the core prior to readout.

Figure 3:
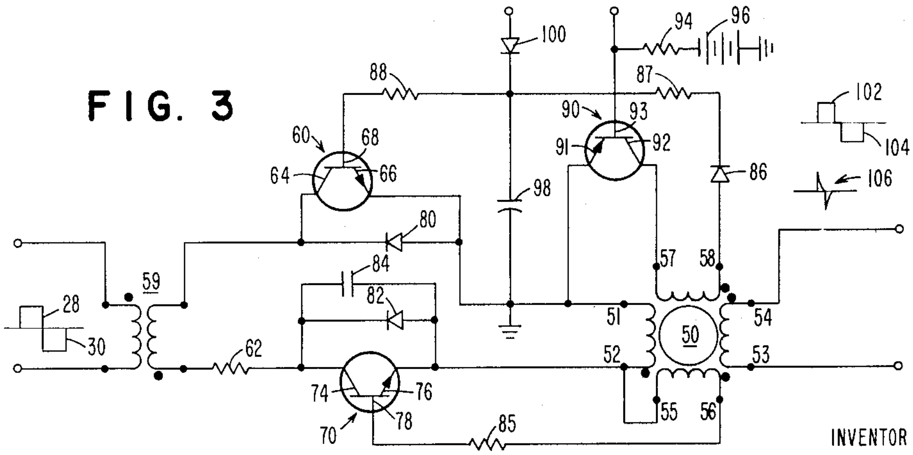
FIG. 3 is a schematic illustration of the presently preferred embodiment of a nondestructive readout circuit employing the novel features of this invention.

FIG. 3 illustrates a nondestructive readout circuit which is the preferred embodiment of this invention. A binary element, comprising a magnetic core 50, constructed from magnetic material that exhibits a substantially rectangular hysteresis loop, has a primary or state changing winding 51–52 coupled thereto. This winding is capable of producing a magnetizing force to drive the core to saturation in either direction when pulsed by a signal of sufficient magnitude and of suitable polarity. The core 50 also has coupled thereto an output winding 53–54, a regenerative winding 55–56 and a sensing or detecting winding 57–58. A readout signal in the form of a square wave is applied to the circuit of FIG. 3 through an input transformer 59. This transformer has one terminal of its secondary winding connected to the collector 64 of an NPN control transistor 60 and the other terminal of its secondary connected to the collector 74 of an NPN regenerative transistor 70 through a current limiting resistor 62. The secondary winding of transformer 59 is connected so that a positive voltage applied to the dotted end of the primary winding of the transformer will be applied to the collector 74 of the regenerative transistor 70.

Blocking diodes 80 and 82 are connected in parallel with the emitter-collector circuits of the transistors 60 and 70, respectively. These diodes provide a low impedance path to positive polarity signals appearing at the emitter of these transistors. A bypass capacitor 84 is connected in parallel with the diode 82. The dotted end of the primary winding 51–52 is connected to the emitter 76 of transistor 70, and the not dotted end of this winding is connected to ground and to the emitter 66 of the control transistor 60. The regenerative winding 55–56 has its dotted end connected to the base 78 of the regenerative transistor 70 through a current limiting resistor 85 and its not dotted end connected to the emitter 76 of this transistor. The bypass capacitor 84 serves to pass the leading portion of the applied square wave for reasons more fully described below. This capacitor may be eliminated if the transistor 70 is selected from the type which presents a fairly large capacitance to the applied square wave. In a circuit utilizing a transistor which presents a fairly low capacitance, such as a 2N336, the capacitor 84 should be approximately .01 microfarad.

The control portion of this nondestructive readout circuit includes the control transistor 60 which is activated by the sensing winding 57–58. The dotted end of the sensing winding 57–58 is connected to the base 68 of transistor 60 through the series circuit comprising a blocking diode 86, a current limiting resistor 87 and bias resistor 88. A capacitor 98 is connected to the emitter electrode 66 of the transistor 60 and to the junction of resistors 87 and 88. The diode 86 is connected to provide a low impedance path to positive voltages induced at the dotted end of the sensing winding 57–58. The control circuit is completed by a PNP transistor switch 90 that is normally biased "on" by a battery 96. This battery has its negative terminal connected to the base electrode 93 of the transistor 90 through a resistor 94 and has its positive terminal grounded. The collector electrode 92 of transistor 90 is electrically attached to the not dotted end of sensing winding 57–58, and the emitter electrode 91 is connected to the grounded emitter 66 of the control transistor 60.

Information may be read into the binary element by controlling the on-off condition of the transistor switch 90 and the control transistor 60 while simultaneously applying the square wave to the transformer 59. A diode 100 which has its cathode connected to the capacitor 98 is provided to control the operating state of transistor 60 for read-in purposes. The manner in which read-in is accomplished will be more fully explained below.

In describing the operation of this circuit, assume that the core is initially in its negative remanent state, that is, it is storing a binary "one." It is desired to read out this information without the destruction of the stored data. A square wave of the type shown in FIG. 2 having a positive first half cycle 28 and a negative second half cycle 30 is applied to the input transformer 59. During the first half cycle of the square wave, a path which includes the current limiting resistor 62, the bypass capacitor 84, winding 51–52 and diode 80 is provided for the positive half cycle of the applied square wave.

As the capacitor 84 passes only the high frequency signals applied thereto, the leading portion of the positive half cycle of the applied square wave produces a voltage which is passed through this capacitor and is applied to the dotted end of the winding 51–52 by way of the aforedescribed path. This votlage produces a positive magnetizing force in the core 50 which drives the core from the negative remanent state and produces a change of flux within the core 50. The changing flux in the core induces a positive voltage at the dotted ends of the output winding 53–54, regenerative winding 55–56 and sensing winding 57–58.

The induced voltage in the regenerative winding provides a base driving current to the transistor 70 which biases this transistor to a conducting state. As there is a positive voltage at the collector electrode 74 of the transistor 70, current flows through this transistor and is applied to the primary winding 51–52 of the core 50. The regenerative circuit acts to rapidly drive the core into its positive saturation region. When the current flow through the collector-emitter circuit of the regenerative transistor 70 reaches a maximum value which is determined by the circuit parameters, there is no longer any change of flux within the core 50. Therefore, the induced voltage in the regenerative winding falls to zero and the regenerative transistor 70 is cut-off.

The high internal collector-emitter impedance of the transistor 70 prevents the remaining portion of the positive driving voltage 28 from being applied to the winding 51–52, and as there is no longer any magnetizing force present, the positive remanent state is established in the core. A positive pulse having an approximate rectangular shape, as shown at 102, is induced in the regenerative, sensing and output windings when the positive portion 28 of the square wave is applied to the transformer 59. When the regenerative transistor cuts-off and the flux in the core returns to the remanent condition, a small negative voltage (not shown) is induced in the core windings. The length of the output pulse 102 is shorter than the length of the applied positive voltage 28 as the regenerative transistor cuts-off while the positive voltage 28 is still being applied to the transformer 59. However, the length of the pulse 102 may be controlled by selecting different values for the components that constitute the regenerative circuit.

The positive voltage induced at the dotted end of the sensing winding 57–58 is applied to the base electrode 68 of the control transistor 60 through the blocking diode 86, the current limiting resistor 87 and the bias resistor 88. This voltage charges the capacitor 98 through the diode 86 and the current limiting resistor 87 and places the control transistor 60 into its low impedance, high conduction state. The effect of the change in the operating state of the control transistor 60 during the application of the positive portion of the square wave is inconsequential as the emitter-collector circuit of this transistor is bypassed by the diode 80 whenever a positive signal is applied to the dotted end of the primary winding.

During the negative portion 30 of the readout signal, the control transistor 60 is biased "on" by the action of the discharge of the capacitor 98 through the resistor 88 and the base-emitter junction of the transistor 60. The time constant of this discharge circuit is designed so that the transistor 60 will be maintained "on" during the entire negative portion of the readout signal. The path provided for this negative signal includes the grounded emitter terminal 66, the emitter-collector circuit of the conducting control transistor 60, the current limiting resistor 62, the diode 82, and the winding 51–52. The application of the negative voltage 30 to the dotted end of the primary winding 51–52 provides a negative magnetizing force which drives the core to the negative saturation region. The corresponding change of flux in the core 50 induces a negative voltage 104 at the dotted ends of the output, regenerative and sensing windings. However, this induced negative voltage does not effect the operation of the regenerative and control circuits as the diode 86 of the control circuit prevents the application of this voltage to the capacitor 98, and the regenerative transistor is not turned "on" by this induced negative voltage. Upon the removal of this negative voltage 30 from the dotted end of the primary windings 51–52, the remanent flux in the core, after readout, is still in the negative direction representing a binary "one".

The waveforms 102 and 104 illustrate the approximate shape of the output voltage obtained when the core is storing a binary "one" and the readout signal is applied to the circuit of FIG. 3. The actual waveform of the output voltage is dependent upon the change of flux in the core with respect to time and is not as smooth as shown. This voltage also contains small positive and negative peaks (not shown) when the magnetizing force is removed from the core and the core returns to one of its remanent states.

Now assume that the core 50 is in the stable positive remanent state, storing a binary "zero," and the same readout signal is applied to the transformer 59. The leading edge of the positive portion 28 of the applied square wave provides a positive voltage to the primary winding 51–52 of the core through the path which includes the resistor 62, capacitor 84 and the diode 80 as previously described. As the core is already in the positive remanent state, the application of this positive voltage to the dotted end of the winding 51-52 acting with the regenerative circuit produces a magetizing force which drives the core into the positive saturation region. The regenerative transistor 70 is cut-off when the current applied to the winding 51–52 reaches its maximum value, as aforedescribed. The magnetizing force is thereby removed from the core, and the positive remanent state is again established in the core. A positive voltage is induced in the windings of the core when the core is driven into the positive saturation region, and a negative voltage is induced when the core returns to the positive remanent state. The positive voltage induced in the sensing winding is applied to the base 68 of the control transistor 60. However, the charge on the capacitor 98 in this case is insufficient to maintain the transistor 60 "on" while the negative portion of the readout signal is being applied to the readout circuit.

During the negative portion 30 of the applied square wave, the control transistor 60 is maintained in the "off" or high impedance state. The emitter-collector circuit of this transistor presents an effectively open circuit in the path of the negative portion of the square wave which prevents this portion of the readout signal from producing a magnetizing force in the core 50. The remanent state of the core after readout occurs is therefore identical to the remanent state prior to readout. The above described regenerative circuit is used to decrease the power consumption or drain of the circuit on the applied square wave and to increase the overall efficiency of the described nondestructive readout circuit.

The voltages induced in the output winding for each of above described conditions is essentially of the same form as that shown at 36 and 38 in FIG. 2. The two waveforms, 102 and 104 in situation and 106 in the other situation, are each of a distinct shape and are indicative of the binary information stored in the core 50. In each of these cases the magnetic remanent state of the core remains unchanged from its initial remanent state after the readout signal is applied to the nondestructive sensing circuits embodying the principles of this invention.

The circuit illustrated in FIG. 3 also includes the necessary elements for reading binary information into the core 50. This is accomplished by the simultaneous application of the aforedescribed square wave and a pulse to control the operating state of either the transistor 60 or the transistor 90.

In the first situation, it is assumed that the core is storing a binary "zero" and it is desired that it store a binary "one." The stable magnetic remanent state of the core must therefore be changed from the positive to the negative condition. A positive pulse, of sufficient magnitude and duration, is applied to the diode 100 to charge the capacitor 98 and to bias the control transistor 60 "on." The charge supplied to the capacitor must be of sufficient magnitude to maintain the transistor 60 "on" for the entire negative portion 30 of the applied square wave. The positive portion 28 of the square wave is applied to transformer 59, and the core 50 is driven into the positive saturation region as previously described. The corresponding small change of flux within the core 50 induces a small positive voltage in the sensing winding 57–58. Although this induced voltage is insufficient to maintain the control transistor 60 "on" during the negative portion of the readout signal, the read-in pulse applied to the diode 100 provides this function. The "on" condition of the transistor 60 completes the path for the negative portion 30 of the applied square wave, which drives the core 50 into its negative saturation region. Upon the removal of the square wave, the remanent flux in the core material will be in the negative direction, representing a binary "one."

In a like manner, if the core is storing a binary "one" state and it is desired that it store a binary "zero," a positive pulse is applied to the base 93 of transistor 90 to cut this transistor "off." Simultaneously with the application of this pulse, the square wave is applied to the transformer 59, and as described above, the positive portion 28 of the square wave acting with the regenerative circuit produces a positive magnetizing force which drives the core from its negative remanent state to the region of flux saturation in the positive direction. The changing flux in the core 50 induces a positive voltage in the sensing winding which would normally bias and maintain the transistor 60 in the "on" condition. However, as the open circuit provided by the "off" transistor 90 prevents the induced voltage from biasing the transistor 60 "on," this transistor remains in the "off" or high internal impedance condition. The path presented to the negative portion 30 of the applied square wave is thus effectively blocked by the high emitter-collector impedance of the reset transistor 60. Therefore, as no negative magnetizing force is produced, the flux in the core remains in the positive direction and establishes the positive remanent state in the core when the positive magnetizing force is removed therefrom.

The circuit of FIG. 2 may be modified in a manner similar to FIG. 3 to provide means for reading information into the core 10. For example, the charge on the capacitor 22 may be controlled by providing an independent charging source for the capacitor through a diode arrangement similar to the diode 100. A normally conducting transistor switch, similar to the transistor 90, located between the diode 24 and the sensing resistor 15 should also be provided to control the charging path of the capacitor 22. The application of a pulse to charge the capacitor 22 or to cut "off" the normally conducting transistor switch in the capacitor charging path while the square wave is simultaneously being applied to the nondestructive circuit of FIG. 2 will change the remanent state of the core 10 in the same manner as that described in connection with FIG. 3. For instance, if the core 10 is storing a binary "zero" and it is desired that it store a binary "one," the transistor switch in the charging path of the capacitor 22 is biased "off" by an applied read-in pulse so that capacitor will not be charged by the positive portion of the applied square wave. The negative portion of the square wave is therefore applied to the winding 11–12 and the core 10 is driven to the negative saturation region which will establish the negative magnetic remanent state in the core upon the removal of the square wave.

If the alternate situation occurs, that is, the core 10 is storing a "one" and a "zero" is to be read into the core, a pulse is applied to charge the capacitor 22 and to turn the transistor 20 "on" while the square wave is simultaneously applied to the circuit. The positive portion of the square wave will drive the core 10 to the positive saturation region. The shunt path provided by the diode 16 and the "on" transistor 20 provides a low impedance path to the negative portion of the square wave which will prevent this portion of the square wave from being applied to the state changing winding 11–12. Upon the removal of the square wave, the core will be in the positive remanent state which represents a binary "zero."

The above described circuits are intended only as illustrative embodiments of the invention. Numerous other advantages, applications and modifications of the invention will be apparent to those skilled in the art and may be made without departing from the spirit and the scope of the invention as set forth in the appended claims. For example, PNP or NPN transistors have been indicated in the description, but it is obvious to one skilled in the art that the PNP or NPN transistors may be replaced by NPN or PNP transistors, respectively, with minor modifications in the described circuits to produce the same results described. In addition, the output waveforms of both the described nondestructive readout circuits are illustrated as being obtained at a separate output winding. But it is evident to those skilled in the art that output signals, which are indicative of the information stored in the core, may be derived at many other points in the described circuits and that it is not necessary for readout purposes that such an output winding be provided. The voltages developed across the resistor 15 in FIG. 2, or that induced in the sensing winding 57–58 in FIG. 3 when the readout signal is applied are related to the remanent state of the binary element and are examples of other points in the described circuits wherein output signals may be obtained. Furthermore, it is contemplated that more than one complete cycle of the square wave shown may be utilized as a readout signal for each of the embodiments described in order to produce repeated output indications of the state of the magnetic element, or readout signals having forms other than the described square wave may obviously be substituted therefor.

What is claimed is:

1. A nondestructive readout circuit for a binary means which is capable of being stabilized in either of two stable states comprising means for applying a signal to said binary means which signal has a first portion and a second portion, means for detecting a change in the stable state of said binary means when said first portion of said signal is applied to said binary means and means energized by said detecting means for controlling the application of said second portion of said signal to said binary means.

2. A nondestructive readout circuit for a binary magnetic element which is capable of being stabilized in either of two stable remanent states comprising a signal source coupled to said binary magnetic element for producing a magnetizing force in said binary magnetic element, said signal having a first portion of one polarity and a second portion of opposite polarity, means for detecting a change in the remanent state of said binary magnetic element when said first portion of said signal produces a change in remanent state in said binary magnetic element and means energized by said detecting means for controlling the application of said second portion of said signal to said binary magnetic element.

3. A nondestructive readout device for a magnetic binary element which is capable of being stabilized in either of two stable magnetic remanent states comprising a state changing winding coupled to said magnetic binary element, means for applying readout signals to said state changing winding, said readout signals each having a first portion of one polarity and a second portion of opposite polarity, sensing means for detecting a change in the stable remanent state of the binary element when said first portion of said readout signal is applied to said state changing winding, and control means connected to said sensing means for controlling the application of said second portion of said readout signal to said state changing winding whereby said control means prevents said second portion of said readout signal from being applied to said state changing winding when said first portion of said readout signal is applied thereto and said sensing means detects no change in the remanent state of said magnetic binary element.

4. A sensing circuit for determining the static remanent state of a binary magnetic element which is capable of being stabilized in either a first magnetic remanent state or a second magnetic remanent state comprising state changing means coupled to said binary element for changing the remanent state of said binary element when energized by a signal which represents a remanent state opposite to the static remanent state of said binary element, means for applying a readout signal to said state changing means, said readout signal having a first portion and a second portion, sensing means connected to said state changing means for detecting a change in the remanent state of the magnetic binary element when said first portion of said readout signal is applied to said state changing means, switching means activated by said sensing means and connected to said state changing means for controlling the application of said second portion of said readout signal to said state changing means, and output means energized by said binary element for producing a voltage waveform which is indicative of the static remanent state of said binary element when said readout signal is applied to said state changing means.

5. A sensing circuit for determining the static remanent state of a binary magnetic element which is capable of being stabilized in either a first magnetic remanent state or a second magnetic remanent state comprising state changing means coupled to said binary element for changing the remanent state of said binary element when energized by a signal which represents a remanent state opposite to the remanent state of said binary element, means for applying a readout signal to said state changing means, said readout signal having a first portion and a second portion, sensing means coupled to said binary element for detecting a change in the remanent state of the binary element when said first portion of said readout signal is applied to said state changing means, switching means activated by said sensing means and connected to said state changing means for controlling the application of said second portion of said readout signal to said state changing means, and output means energized by said binary element for producing an indication of the static remanent state of the binary element when said readout signal is applied to said state changing means.

6. A nondestructive readout circuit for a binary means capable of being stabilized in either of two stable states comprising state switching means coupled to said binary means, means for applying a readout signal to said state switching means, said readout signal having a first and a second portion, said first portion of said readout signal switching the stable state of said binary means only when said binary means is in a predetermined one of its stable states, said second portion of said readout signal switching said binary means only when it is in the other one of its stable states, control means connected to said state switching means for controlling the application of said second portion of said readout signal to said state switching means, sensing means coupled to said state switching means for energizing said control means whereby said control means blocks the second portion of said readout signal and prevents it from being applied to said state switching means, and output means coupled to said binary means for providing an indication of the initial stable state of the binary means when the readout signal is applied to said state switching means.

7. The circuit of claim 6, including further means connected to said control means for providing external control signals to said control means while said readout signal is applied to said state changing winding.

8. A nondestructive readout circuit for producing an output signal which is indicative of the static stable magnetic remanent state of a binary magnetic element comprising in combination, a magnetic binary element which is capable of assuming either of two stable states of magnetic remanence, state changing means coupled to said magnetic binary element for setting said magnetic binary element into corresponding states of magnetic remanence when activated by an incoming signal, means for applying a readout signal to said state changing means, said readout signal having a first portion and second portion, said first portion being capable of setting said magnetic binary element into one of its stable remanent states when said first portion of said readout signal is applied to said state changing means, said second portion of said readout signal being capable of setting said binary magnetic element into the other of its stable states, means for detecting a change in the static stable magnetic remanent state of said magnetic element when said first portion of said readout signal is applied to said state changing means, and switching means connected to said detecting means for controlling the application of the second portion of said readout signal to said state changing means whereby said switching means prevents the second portion of said readout signal from being applied to said state changing means when said detecting means determines that the first portion of said readout signal has not changed the static remanent state of said magnetic binary element.

9. The circuit of claim 8, including means coupled to said switching means for providing read-in signals to said switching means while said readout signal is applied to said state changing means whereby a predetermined one of said two stable states of magnetic remanence is established as the static stable remanent state of said binary magnetic element.

10. A nondestructive readout circuit for a magnetic binary element which has a positive stable remanent state and a negative stable remanent state, comprising; state changing windings capable of driving the magnetic binary element from its positive stable remanent state to its negative stable remanent state when pulsed by a signal of sufficient magnitude and proper polarity, said state changing windings being coupled to said magnetic binary element, means for applying a readout signal to said state changing windings, said readout signal having a first positive portion and a second negative portion, said first positive portion of said readout signal establishing the positive remanent state in said binary element when said readout signal is applied to said state changing windings and said second portion of said readout signal establishing the negative remanent state in said binary element when said readout signal is applied to said state changing windings, sensing means energized by said binary element when said first portion of said readout signal changes the remanent state of said magnetic binary element, control means connected between said state changing windings and said means for applying said readout signal, said control means initially blocking the application of said second portion of said sensing means to said control means whereby said sensing means activates said control means which unblocks the path for said second portion of said readout signal, and output means for producing a voltage waveform when the readout signal is applied to said state changing windings which is indicative of the initial remanent state of the binary element.

11. A nondestructive readout circuit for a magnetic binary element which has a positive stable remanent state and a negative stable remanent state, comprising; a state changing winding capable of driving the magnetic binary element from its positive stable remanent state to its negative stable remanent state when pulsed by a signal of sufficient magnitude and proper polarity and coupled to said magnetic binary element, means for applying a readout signal to said state changing winding, said readout signal having a first positive portion and a second negative portion, said first positive portion of said readout signal establishing the positive remanent state in said binary element when said readout signal is applied to said state changing winding and said second portion of said readout signal establishing the negative remanent state in said binary element when said readout signal is applied to said state changing winding, sensing means energized by said first portion of said readout signal when said readout signal is applied to said state changing winding and the remanent state of the binary element remains unchanged, control means connected in parallel with said state changing winding, means connecting said sensing means to said control means whereby said control means provides a bypass path for the second portion of said readout signal when it is energized by said sensing means, and output means coupled to said binary element for indicating the initial remanent state of the binary element.

12. A nondestructive readout device for a magnetic binary element which has two stable states of magnetic remanence, comprising; a winding coupled to said magnetic binary element, said winding being capable of establishing either of the two stable magnetic remanent states in the magnetic binary element when pulsed by a signal of sufficient magnitude and proper polarity, means for applying a readout signal having a first portion of one polarity and a second portion of opposite polarity to said winding, said first portion of said readout signal being capable of establishing one of said stable remanent states in said magnetic binary element and said second portion of said readout signal being capable of establishing the other stable state in said binary element, sensing means coupled to said binary element for determining if the magnetic binary element has changed its stable remanent state when said first portion of said readout signal is applied to said winding, control means actuated by said sensing means and connected in series with said winding, said control means operating to block the application of said second portion of said readout signal until said control means is actuated by said sensing means whereby the initial stable state of the magnetic binary element is maintained by the binary element after the readout signal has been applied thereto, and output means energized whenever said binary element changes its remanent state for indicating the initial stable remanent condition of said binary element.

13. A nondestructive readout device for a magnetic binary element which has two stable states of magnetic remanence, comprising; a winding coupled to said magnetic binary element, said winding being capable of establishing either of the two stable magnetic remanent states in the magnetic binary element when pulsed by a signal of sufficient magnitude and proper polarity, a source of readout signals coupled to said winding, each of said readout signals having a first portion of one polarity and a second portion of opposite polarity, said first portion of any of said readout signals being capable of establishing one of said stable remanent states in said magnetic binary element and said second portion of any of said readout signals being capable of establishing the other stable state in said binary element, sensing means coupled to said winding for determining if the magnetic binary element has changed its stable remanent state when said first portion of any of said readout signals is applied to said winding, control means actuated by said sensing means and connected in parallel with said winding, said control means operating to prevent the second portion of any of said readout signals from being applied to said winding when activated by said sensing means whereby the initial stable state of the magnetic binary element is maintained by the binary element after the readout signals have been applied thereto, and output means energized whenever said binary element changes its remanent state for indicating the initial stable remanent condition of said binary element.

14. A sensing circuit for determining the direction of the static remanent flux of a magnetic binary element constructed from a material having substantially rectangular hysteresis loop characteristics comprising, state changing means coupled to said magnetic binary element for changing the state of said binary element from one of its stable remanent states to the other of its stable remanent states, means for applying a signal having a first portion and second portion to said state changing means, the application of said first portion of said signal to said state changing means positioning said magnetic binary element in one of its regions of magnetic saturation and the application of said second portion of said signal to said state changing means positioning said magnetic binary element in the other of its regions of magnetic saturation, means for detecting changes in the flux of said magnetic binary element when said first portion of said signal is applied to said state changing means, switching means connected to said detecting means for controlling the application of said second portion of said signal to said state changing means whereby said switching means prevents the second portion of said signal from being applied to said state changing means when said detecting means determines that the first portion of said signal has not changed the direction of flux within the magnetic binary element, and output means coupled to said magnetic binary element for indicating the direction of the static remanent flux of the binary element when said signal is applied to said state changing means.

15. The sensing circuit of claim 14, including read-in means for positioning the magnetic binary element in one of its stable remanent states, said read-in means being connected to said switching means, and means for appling read-in signals to said read-in means while said signal is applied to said state changing means.

16. A magnetic storage device comprising a toroidal shaped magnetic core having two stable states of magnetic remanence, an input winding positioned about said magnetic core for placing said core in one or the other of said stable remanent states when pulsed by a signal of sufficient magnitude and proper polarity, an output winding positioned about said core for indicating changes in the remanent state of the magnetic core when said input winding is pulsed, a sensing resistor connected in series with said input winding, a source of input signals connected in series with said input winding and said series resistor, said input signals including a positive polarity signal and a negative polarity signal, a transistor switching circuit connected in parallel with said input winding, said transistor switching circuit providing a bypass path for said negative polarity signal when said transistor switching circuit is activated, and a storage capacitor connected in parallel with said sensing resistor and to said transistor switching circuit, said storage capacitor activating said transistor switching circuit when said input signals are applied to said input winding and a major portion of said positive polarity signal appears at said sensing resistor whereby the bypass path for said negative polarity signal is provided.

17. A magnetic device comprising a core constructed from a material having a substantially rectangular hysteresis loop characteristic; state changing means coupled to said magnetic core; means for applying a readout signal to said state changing means, said readout signal having a first portion and a second portion; regenerative means connected to said state changing means and to said core, said regenerative means being energized by said readout signal and signals induced from said magnetic core for driving said magnetic core into a saturation region of said hysteresis loop; sensing means coupled to said magnetic core for detecting a change in the remanent state of said magnetic core when said first portion of said readout signal is applied to said state changing means; switching means activated by said sensing means and connected to said state changing means for controlling the application of said second portion of said readout signal to said state changing means; and output means energized by the change of flux within said magnetic core for producing an indication of the static remanent state of the magnetic core when said readout signal is applied to said state changing means.

18. A magnetic storage device comprising a toroidal shaped core constructed from a magnetic material which exhibits a substantially rectangular hysteresis loop characteristic; an input winding positioned about said magnetic core and adapted to place said core in one or the other of the stable remanent states of said magnetic material when pulsed by an incoming signal; an output winding positioned about said core for indicating changes of flux within said core when said input winding is pulsed; regenerative means for rapidly driving said core into one of its regions of magnetic saturation, said regenerative means including a regenerative winding coupled to said magnetic core and a regenerative transistor connected to said regenerative winding; control means including a control transistor, unidirectional means connected in parallel with said control transistor for passing positive signals applied thereto and a storage element, said storage element being connected to said control transistor for controlling the conduction state of said control transistor; a source of input signals, said input signals having a first positive portion and a second negative portion; means connecting said source of input signals, said control transistor, said regenerative transistor and said input winding in a series circuit whereby said first positive portion of said input signal is applied to said input winding to drive said core from its initial remanent state to the positive saturation region of said magnetic material; and sensing means coupled to said core for detecting changes in the direction of the flux of said core, said sensing means being connected to said storage element of the control circuit for energizing said storge element when the positive portion of said input signal is applied to said input winding and said sensing means detects a change in the direction of the flux within said core whereby said control transistor conducts and provides a path for the application of said second portion of said input signal to said input winding.

19. A nondestructive readout circuit for a magnetic storage element comprising a toroidal shaped core constructed from a magnetic material which exhibits a substantially rectangular hysteresis loop characteristic; an input winding positioned about said magnetic core and adapted to be pulsed by a signal to place said core in one or the other of the stable remanent states of the magnetic material; regenerative means including a regenerative transistor, a unidirectional device for passing negative signals connected in parallel with said regenerative transistor, a bypass capacitor connected in parallel with said regenerative transistor, and a regenerative winding coupled to said magnetic core and connected to said regenerative transistor; control means including a transistor switch, a unidirectional device connected in parallel to said transistor switch for passing positive signals, and a storage capacitor for biasing said transistor switch into a current conducting state; a source of readout signals, said readout signals having a first positive portion and a second negative portion; means connecting said source of readout signals, said transistor switch, said input winding, and said regenerative transistor in a series circuit whereby the first portion of said readout signal is applied to said input winding and drives said core from its static remanent state to the region of flux saturation in the positive direction; sensing means coupled to said core for detecting a change in the direction of the flux within said core when said positive portion of said readout signal is applied to said input winding; and means connecting said sensing means to said storage capacitor whereby said storage capacitor is energized by said sensing means and biases said transistor switch to a conductive state when said sensing means detects a change of flux direction in said magnetic core.

20. The nondestructive readout circuit of claim 19, including an output winding coupled to said magnetic core for indicating changes of flux in said core when said readout signal is applied to said input winding.

21. The nondestructive readout circuit of claim 20, further including means for energizing said storage capacitor and means for disconnecting the path between said sensing means and said storage capacitor while said readout signal is applied to said input winding whereby the static remanent state of the magnetic core is set.

References Cited by the Examiner

UNITED STATES PATENTS 2,913,708 11/59 Paull ---------------- 307—88.5

IRVING L. SRAGOW, *Primary Examiner.*